(12) United States Patent
Wakefield, II (10) Patent No.: US 6,871,122 B1
(45) Date of Patent: Mar. 22, 2005

(54) METHOD OF ADJUSTING GLOBALLY PERFORMANCE PARAMETERS OF A POWER DRIVEN WHEELCHAIR

(75) Inventor: Theodore D. Wakefield, II, Vermillion, OH (US)

(73) Assignee: Invacare Corporation, Elyria, OH (US)

( * ) Notice: Subject to any disclaimer, the term of this patent is extended or adjusted under 35 U.S.C. 154(b) by 4 days.

(21) Appl. No.: 10/667,815

(22) Filed: Sep. 22, 2003

(51) Int. Cl.$^7$ ................................................ G05D 1/00
(52) U.S. Cl. ........................... 701/1; 701/36; 180/65.8
(58) Field of Search .............................. 701/1, 36, 41, 701/58, 70, 82, 93; 180/65.1, 65.5, 65.6, 65.8, 907; 319/139, 432, 433, 434

(56) References Cited

U.S. PATENT DOCUMENTS 5,818,189 A * 10/1998 Uchiyama et al. .......... 318/488
6,302,226 B1 * 10/2001 Kanno et al. ................. 180/6.5
6,459,962 B2 * 10/2002 Ulrich et al. ................... 701/1
6,541,938 B2 *  4/2003 Okamura et al. ........... 318/778

* cited by examiner

*Primary Examiner*—Richard Camby
(74) *Attorney, Agent, or Firm*—William E. Zitelli; Calfee, Halter & Griswold (57) ABSTRACT

A method of adjusting globally performance parameters of a power driven wheelchair for a plurality of drive programs thereof comprises the steps of: programming a microcontroller with a plurality of drive programs for operating the wheelchair, each drive program including a multiplicity of adjustable performance parameters; adjusting a selected performance parameter of the multiplicity to a desired result; setting a global flag to a desired status; storing the desired result of the selected performance parameter solely in memory allocated to a selected drive program of the plurality when the global flag is set to a first status; and storing the desired result of the selected performance parameter globally in memory allocated to each of the drive programs of the plurality when the global flag is set to

20 Claims, 5 Drawing Sheets

| DRIVE 1 | DRIVE 2 | DRIVE 3 | DRIVE 4 | |
|---|---|---|---|---|
| SPEED | | | | — R1 |
| RESPONSE | | | | — R2 |
| ⋮ | ⋮ | ⋮ | ⋮ | |
| TORQUE | | | | — Rj |
| POWER LEVEL | | | | — Rj+1 |
| ⋮ | ⋮ | ⋮ | ⋮ | |
| NO DRIVING | | | | — Rn |

METHOD OF ADJUSTING GLOBALLY PERFORMANCE PARAMETERS OF A POWER DRIVEN WHEELCHAIR

BACKGROUND OF THE INVENTION

The present invention is directed to the field of power driven wheelchairs, in general, and more particularly, to a method of adjusting globally performance parameters of the wheelchair for the drive programs thereof.

Figure 1:
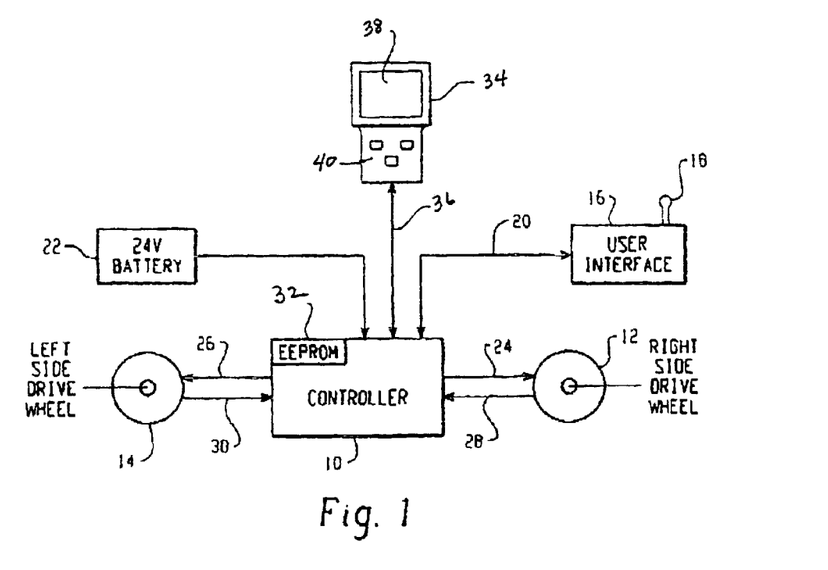
FIG. 1 is a block diagram schematic illustration of an exemplary motor drive arrangement for a wheelchair.

Power driven wheelchairs which may be of the type manufactured by Invacare Corporation of Elyria, Ohio, for example, generally include right and left side drive wheels driven by a motor controller via respectively corresponding right and left side drive motors, all of which being disposed on the wheelchair. An exemplary illustration of such a motor drive arrangement is shown in the schematic of FIG. 1. Referring to FIG. 1, a motor drive controller 10 which may be an Invacare MK IV™ controller, for example, controls drive motors 12 and 14 which are mechanically linked respectively to the right side and left side drive wheels of the wheelchair. A user interface 16 which may include a joystick 18 and selection switches (not shown) operable by a user is also disposed on the wheelchair in a convenient location to the user. The user interface 16 is generally interfaced to the controller 10 over a two wire serial coupling 20 to permit the user to select a drive program appropriate for operating the wheelchair in its environment and to adjust the direction and speed of the wheelchair within the selected drive program. The controller 10 may be programmed with a plurality of drive programs, each suited for a particular operating environment.

The motor controller 10 is generally powered by a battery source 22, which may be 24 volts, for example, also disposed on the wheelchair. The drive motors 12 and 14 may be of the permanent magnet type and may be either a gearless, brushless AC motor or a brush type DC motor. The controller 10 may include a microcontroller interfaced and responsive to the user interface 16 to control drive signals 24 and 26 to motors 12 and 14, respectively, via a power switching arrangement configured in accordance with the motor type being driven. The power switching arrangement may be powered by the 24V battery 22. Thus, as the user adjusts the speed and direction of the wheelchair via the joystick of interface 16, appropriate drive signals 24 and 26 are controlled by controller 10 to drive the motors 12 and 14 accordingly. Controller 10 generally controls motor speed to the user setting in a closed loop manner.

Actual speed of each motor 12 and 14 is derived from signals 28 and 30 respectively sensed therefrom. For example, for AC motors, a Hall Effect sensor may be disposed at the motor for sensing and generating a signal representative of angular position. The controller 10 may derive motor speed from a change in angular position for use as the actual speed feedback signal for the closed loop speed control of the motor. For DC motors, the voltage Va across the armature and armature current Ia may be sensed from each motor 12 and 14 and provided to the controller 10 via lines 28 and 30, respectively. Controller 10 may in turn derive the actual speed of each motor 12 and 14 from the respective voltage Va and current Ia measurements thereof for use as the speed feedback signal for the respective closed loop speed control of each motor 12 and 14.

For safety purposes, certain performance parameters of the wheelchair are preset during manufacture and stored in a non-volatile memory 32, which may be an electrically erasable programmable read only memory (EEPROM), for example. The motor controller 10 is constrained in its control of the drive motors by these performance parameters. However, these factory preset performance parameters are established for an average user and are not meant to satisfy the safety needs and operating capabilities of all users. So, the wheelchair manufacturer stores the average performance parameters in a non-volatile memory which is alterable in the field, like the EEPROM.

When a power driven wheelchair is sold to a user at a dealership, for example, before the user may be allowed to operate the wheelchair unattended, a trained medical health adviser works with the user to determine safe performance parameters for the user based on the user's cognitive response and physical limitations, like tremors, arthritis, . . . etc. Currently, each of the aforementioned performance parameters is individually determined to satisfy each user's needs. Once determined, each of the new performance parameters is entered into the non-volatile memory 32 of the controller 10 through a remote programmer 34 which may be electrically coupled to a port of the microcontroller of controller 10 via signal lines 36, for example, thus, rendering the wheelchair unique to the user's safe operating capabilities.

Each dealer is generally provided with one or more remote programmers 34. Each remote programmer 34 may include a screen 38 for displaying interactive text and graphics and a plurality of pushbuttons 40 for communicating with the microcontroller which is programmed to interact with the programmer 34 and EEPROM 32 as will become more evident from the description found herein below.

Determining each safe performance parameter for a user may require an iterative procedure. That is, a user may first operate the wheelchair with a preset performance parameter, like forward speed, for example, under the observation of the medical adviser. If the user operation is found unacceptable, then a new parameter setting is entered into the controller via the programmer and the user operates the wheelchair with the newly entered parameter. From the observations, the medical adviser may re-adjust the parameter setting to better suit the user's operating capabilities and the procedure is repeated until the medical adviser is satisfied that the parameter setting is safely within the user's operational capabilities.

This iterative procedure is performed individually for each performance parameter for a drive program and the process is repeated for each drive program of the controller. Understandably, the determination of the individual performance parameters currently performed for each drive program is a very timely and costly operation which needs improvement. The present invention is intended to address the timeliness and cost of the current parameter setting technique for each drive program and provide a method which overcomes the drawbacks thereof.

SUMMARY OF THE INVENTION

In accordance with one aspect of the present invention, a method of adjusting globally performance parameters of a power driven wheelchair for a plurality of drive programs thereof comprises the steps of: programming a microcontroller with a plurality of drive programs for operating the wheelchair, each drive program including a multiplicity of adjustable performance parameters; adjusting a selected performance parameter of the multiplicity to a desired result; setting a global flag to a desired status; storing the desired result of the selected performance parameter solely in memory allocated to a selected drive program of the plurality when the global flag is set to a first status; and storing the desired result of the selected performance parameter globally in memory allocated to each of the drive programs of the plurality when the global flag is set to a second status.

In accordance with another aspect of the present invention, a method of adjusting globally performance parameters of a power driven wheelchair for a plurality of drive programs thereof comprises the steps of: programming a microcontroller with a plurality of drive programs for operating the wheelchair, each drive program including a multiplicity of adjustable performance parameters; coupling an interactive programmer unit to the microcontroller, allocating memory registers of a memory to each of the plurality of drive programs for storage of the performance parameters associated therewith; adjusting a selected performance parameter of the multiplicity to a desired result through the interactive programmer unit; setting a global flag to a desired status through the interactive programmer unit; storing the desired result of the selected performance parameter solely in the memory allocated to a selected drive program of the plurality when the global flag is set to a first status; and storing the desired result of the selected performance parameter globally in the memory allocated to each of the drive programs of the plurality when the global flag is set to a second status.

DETAILED DESCRIPTION OF THE INVENTION

Figure 2:
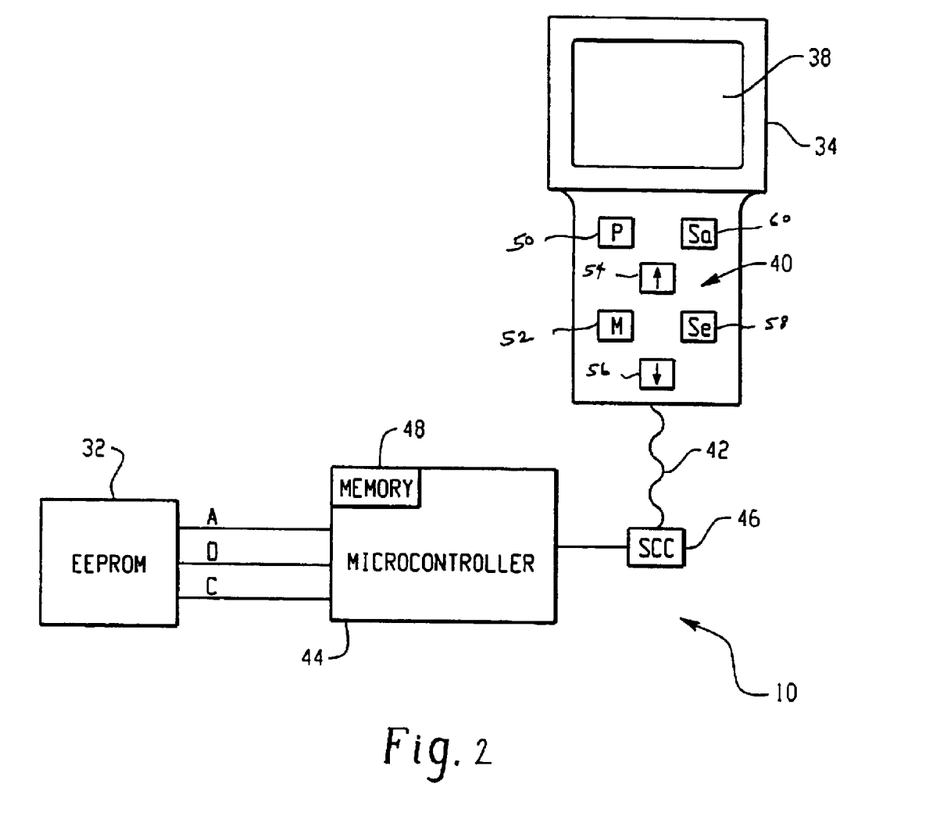
FIG. 2 is a block diagram schematic of apparatus suitable for embodying an aspect of the present invention.

In the embodiment of FIG. 2, the remote programmer 34 communicates with the controller 10 via serially coded signals over lines 42. The controller 10 may include a programmed microcontroller 44 which may be of the type manufactured by Motorola bearing model no. MC9S12A128, for example. The serial lines 42 may be coupled to the microcontroller 44 through a serial communication controller 46 which may be of the type licensed by Echelon Corporation and manufactured by Toshiba bearing model no. TMPN3150, for example. The tasks of the Echelon controller 46 include setting the protocol, performing serial/parallel translations, checking for errors in transmission, and managing the traffic for the serial communication between the remote controller 34 and microcontroller 44.

The microcontroller 44 may include an internal memory 48 which may be of the random access (RAM) or scratch pad type, for example, and is coupled to the EEPROM 32 over address (A), data (D) and control (C) lines. While the memory 48 is shown internal to the microcontroller 44, it is understood that a portion or all of the memory 48 may be just as well external to the microcontroller 44. Generally, when powered up, the controller 44 will boot up under program control and may access the preset parameters and relationships stored in the EEPROM 32 and store them temporarily to the scratch pad memory 48 for interaction with the remote programmer 34 and operation of the wheelchair. It is understood that when power is removed, the stored data of the RAM 48 will be lost. Only, the EEPROM 32 will retain the data of its memory without power.

As indicated above, the microcontroller 44 is programmed to interact with the remote controller 34 via signal lines 42 and communication controller 46 for entry of performance parameter values or settings by the drive program. More specifically, the remote programmer 34 utilizes the pushbuttons 40 to interact with the microcontroller 34 via text images on the screen 38 thereof. An exemplary remote programmer 34 is shown in the illustration of FIG. 2. In the present embodiment, the programmer 34 includes a power pushbutton (PB) 50 which may be used to turn on and off the display screen 38 which may be of the liquid crystal display (LCD) type, for example. A menu PB 52 is programmed to return the LCD 38 to a previous screen image. For example, if a parameter is being adjusted in a current screen image, depressing the menu PB 52 returns the display to a Performance menu image and depressing the PB 52 again will cause the display to change to a main menu image as will become more evident from the description found herein below.

The programmer further includes up and down PBs 54 and 56, respectively, which are used to move a selection arrow or pointer in the screen image up or down, or adjust a parameter value up or down. Also included in the programmer 34 is a select PB 58 which, when depressed, chooses the parameter to which the selection arrow on the screen image is pointing and causes the appropriate next screen image to appear on the LCD 38. Still further, a save PB 60 causes a parameter setting or value to be saved in memory when depressed. The functions of the various PBs 50–60 of the programmer 34 will become more evident from the following description.

Figure 3:
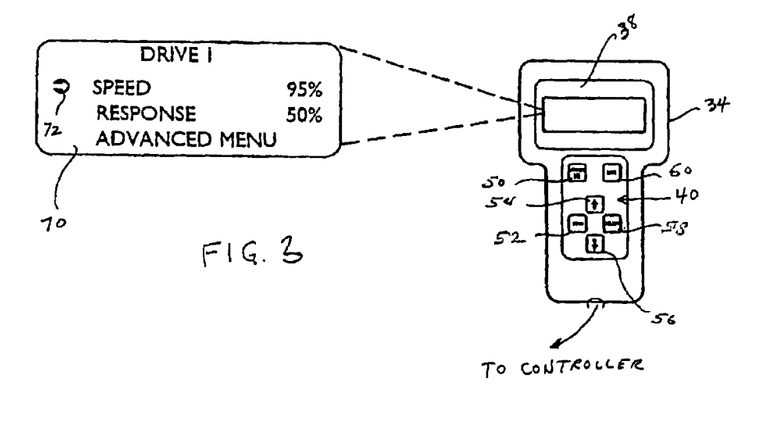
FIG. 3 is an illustration of an exemplary main menu screen image of a programmer suitable for use in the apparatus of FIG. 2.

As shown in FIG. 3, when the programmer 34 is powered up and the LCD is turned on, a main menu image is displayed on the LCD 38. An exemplary main menu image for the present embodiment is shown at 70. Referring to the main menu image 70, the drive program to which the parameter values or settings are referenced appears at the top of the menu. Drive 1 may be the default setting and thus, would appear upon powering the programmer. Three other text lines which appear on the main menu image in the present example are Speed, Response, and Advanced Menu. To perform parameter adjustments, the Advanced Menu text line is selected by depressing the down PB 56 until the pointer 72 is aligned with the Advanced Menu test line and then, depressing the select PB 58. The next screen image provides a plurality of text lines for selection such as shown by way of example in FIG. 4.

Figure 4:
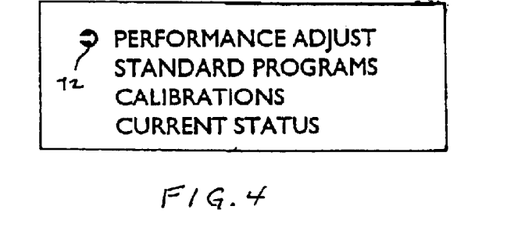
FIGS. 4, 6 and 7 are exemplary screen image displays of the programmer for use in setting performance parameters of the wheelchair of FIG. 1.
Figure 5:
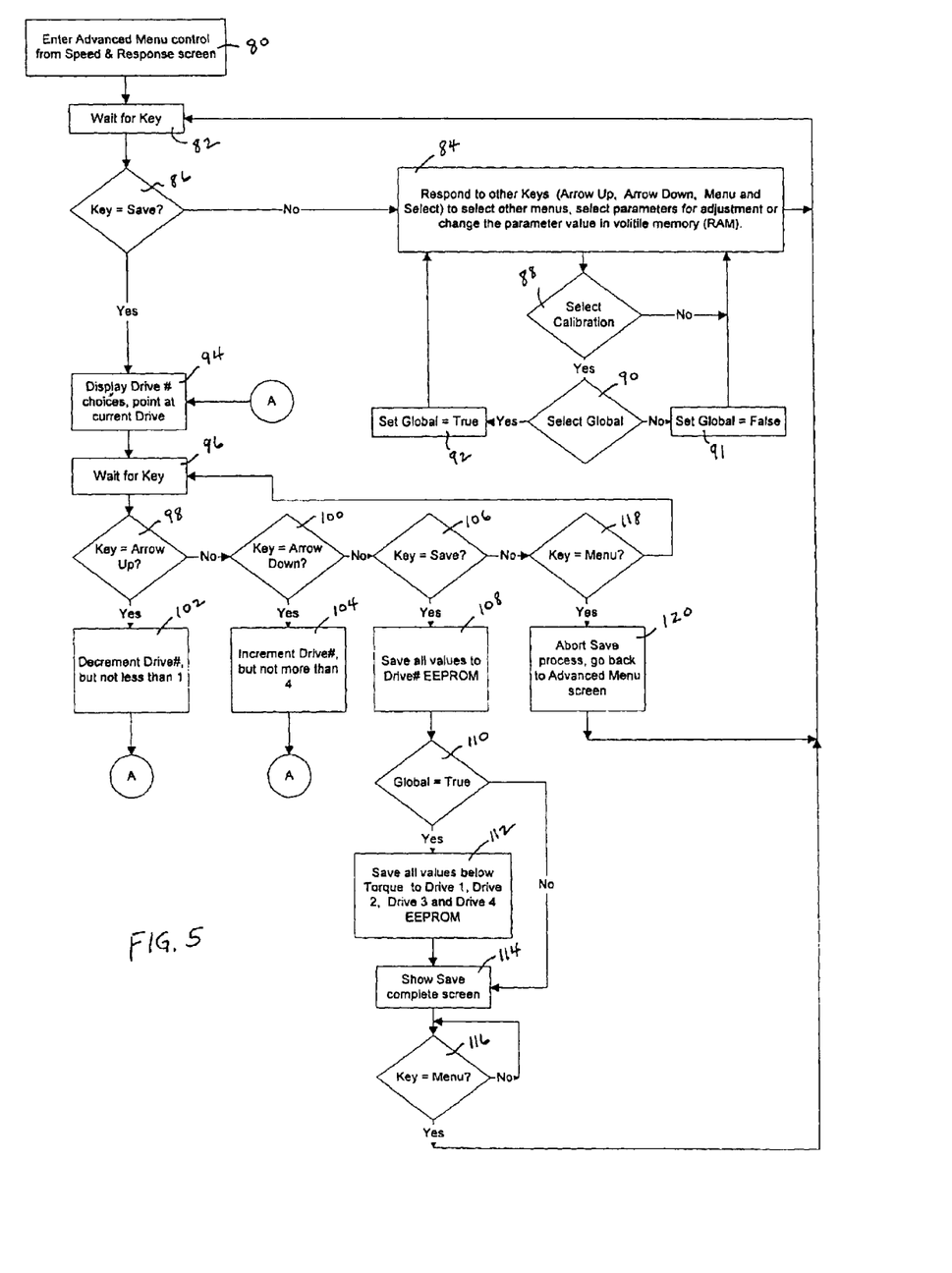
FIG. 5 is a flowchart of an exemplary program executable by the apparatus of FIG. 2 for carrying out an aspect of the present invention.

The flowchart of FIG. 5 exemplifies a program for execution by the microcontroller 44 for performing tasks in accordance with the broad principles of the present invention. Referring to FIG. 5, in block 80, the microcontroller 44 responds to the selection of the Advanced Menu text line from the main menu (see FIG. 3) whereupon the screen menu image of FIG. 4 is transmitted to the programmer 34 for display on the LCD screen 38 thereof. In block 82, the program waits for the depression of a pushbutton or key on the programmer 34. If any key other than the save key is depressed, program execution is diverted to block 84 by a decisional block 86. In block 84, the program will respond to PBs of the programmer 34 other than the save PB 60.

Figure 6:
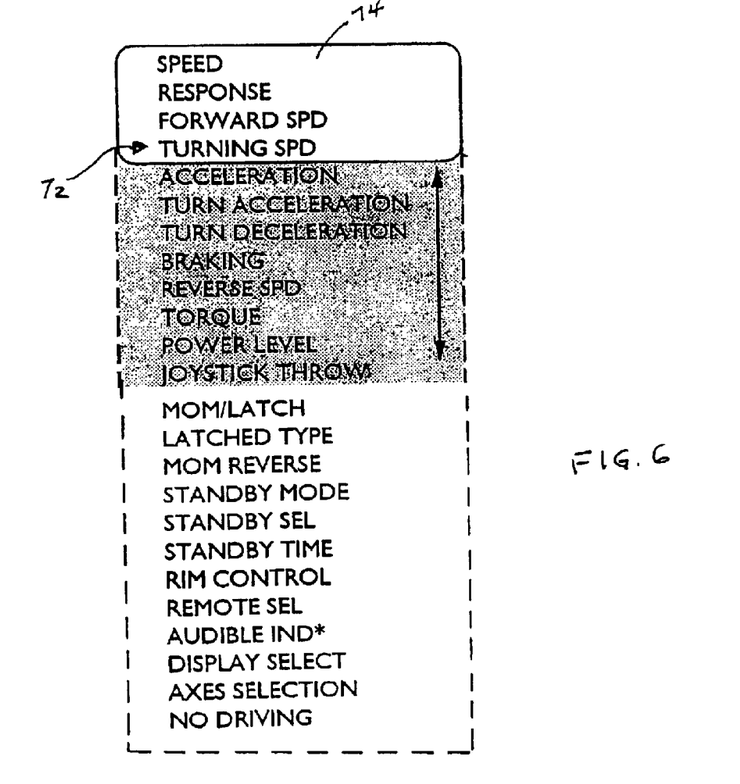

For example, if one or more performance parameters are to be adjusted, the Performance Adjust text line (se FIG. 4) is selected which results in an image screen of performance parameters such as shown by way of example in FIG. 6. In the present embodiment, only four parameters may appear in the screen image 74 at any given time as shown by the illustration of FIG. 6. However, all of the parameters in the list shown in FIG. 6 are accessible for display in the screen image 74 by scrolling the arrow 72 up and down the list of parameters using the up and down PBs 54 and 56. Accordingly, any parameter in the list of parameters exemplified in FIG. 6 may be selected by aligning the arrow 72 with the appropriate text line and depressing the selection PB 58, for example.

Upon selection of a parameter, the appropriate parameter adjustment screen image will appear on the display and the operator may adjust the value or setting thereof through use of the up and down arrows 54 and 56, for example. Once adjusted or set, the operator may return to the previous parameter screen image (see FIG. 6) by depressing the menu PB 52 and select another parameter for adjustment or setting. Once the parameters are adjusted to their desired values and settings, the desired values and settings thereof may be saved to memory by depressing the save PB 60 which is detected by the block 86 in the exemplary program of FIG. 5. In past systems, all of the parameters listed in FIG. 6 had to be adjusted and saved individually to a drive program of the wheelchair. If the controller of the wheelchair is programmed with four drive programs as in the present embodiment, then all of the parameters would have to be adjusted or set for all four drive programs.

However, Applicant has recognized that some of the parameters in the list of FIG. 6 and especially those listed below the torque parameter, for example, may be adjusted or set once and be saved globally to all of the drive programs 1–4, thus, reducing the time and effort to fully program the wheelchair to the needs of the user. For example, the parameters starting with Power Level and including Joystick Throw, Mom/Latch, . . . etc. down to No Driving may be grouped together for global saving their adjustments or settings to all of the drive programs 1–4 upon selection to do so.

In the present embodiment, the microcontroller is programmed to accept selection of global saving of the adjustment values and settings of those parameters listed below the torque parameter in FIG. 6 to all of the drives 1–4. This selection process may be performed in block 84 of the program flowchart of FIG. 5. More specifically, from the menu screen image of FIG. 4, the text line Calibrations may be selected as described herein above. The program detects the Calibrations selection in block 88 and diverts program flow to program block 90 which displays another menu screen image in which the Global saving state is displayed on a text line for selection. If Global savings is selected according to the foregoing described method, decision block 90 diverts program flow to block 92 in which a Global flag is set true. If Global savings is not selected, decision block 90 diverts program flow to block 91 in which a Global flag is set false. After the execution of either block 91 or block 92, then program flow returns to block 84. Also, should Calibrations not be selected, then program flow returns to block 84 and the Global flag remains unchanged in status.

Now, when the save PB 60 is depressed and detected by block 86 of the program of FIG. 5, then the program responds in block 94 by displaying a drive menu selection screen image on the LCD 38. An exemplary drive menu selection image is shown by way of example in FIG. 7 wherein the four drives 1–4 are displayed in text rows. In the present embodiment, the pointer 72 initially points to the current drive selection which may be drive 1. In this state, the program waits for the depression of a PB or key in block 96. If the up arrow PB 54 or down arrow PB 56 are depressed, it is detected in the blocks 98 and 100, respectively. The drive number is decremented or incremented accordingly in blocks 102 and 104, respectively, to arrive at the desired drive for saving the parameter values and settings.

Figure 7:
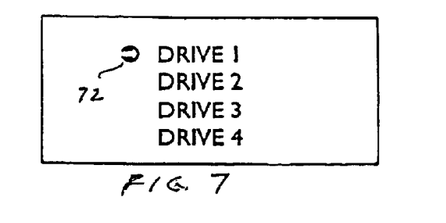
Figure 8:
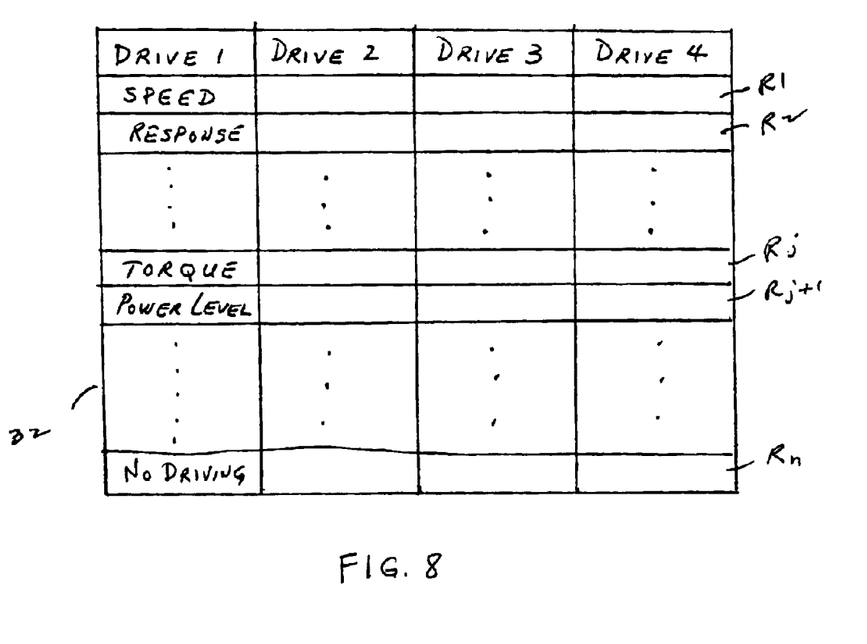
FIG. 8 is an illustration of a non-volatile memory suitable for use in the apparatus o FIG. 2.

Once the desired drive number is selected by aligning the pointer 72 next to the drive number on the menu screen of FIG. 7, then the save PB 60 is depressed and detected by the block 106 which diverts program execution to block 108. In block 108, all values and settings of the parameters are saved to the non-volatile memory, like the EEPROM 32, for example. Memory registers of an exemplary non-volatile memory 32 is shown by way of example in FIG. 8. Referring to FIG. 8, each drive program of the present embodiment, Drive 1 through Drive 4, has a set of memory registers R1, R2, . . . , Rj, Rj+1, . . . , Rn in which to store the listed parameters of FIG. 6, for example. Thus, for each Drive program, the Speed value may be stored in the register R1, the Response value in R2 and so on down to the torque value which may be stored in the register Rj. All of the parameter values and setting for each of the drive programs listed below torque in FIG. 6 may be stored in the registers Rj+1 to Rn, respectively.

So, if Drive 1 was selected when the save PB 60 was depressed and detected by block 106, then the values and settings of the parameters will be stored by block 108 in the Drive 1 set of registers R1 through Rn as shown in FIG. 8.

Thereafter, program execution continues at block 110 wherein it is determined whether or not the Global flag is set true. If so, then in block 112, the values and settings of the parameters listed below the torque parameter in FIG. 6 are stored globally in the set of drive registers Rj+1 through Rn, respectively, for all of the other drives Drive 2 through Drive 4, for example. If the Global flag is set false, then block 112 is circumvented by the program. After storing the parameter values and settings to the non-volatile memory 32, a save complete image is displayed on screen 38 by block 114 and remains displayed until the menu PB 52 is depressed and detected by block 116. Block 116 causes a change in the display 38 back to the Advance menu screen image of FIG. 4 and then, diverts program execution back to block 82 for adjusting other parameter values and settings for other drive programs and the foregoing described procedure is repeated.

Should it be decided in the present embodiment not to save the parameter values and settings while in the drive menu selection screen image of FIG. 7, the menu PB 52 may be depressed instead of the save PB 60. In this state as shown in the program flowchart of FIG. 5, the depression of the menu PB 52 is detected by block 118 which aborts the save process and diverts program execution to block 120 which causes a change in the display 38 back to the Advance menu screen image of FIG. 4 and then, diverts program execution back to block 82 for adjusting other parameter values and settings for other drive programs and the foregoing described procedure is repeated.

While the present invention has been described in connection with one or more embodiments, it is understood that such description was presented by way of example without intention of limiting the present invention in any way. Rather, the present invention should be construed in breadth and broad scope in accordance with the recitation of the appended claims hereto.

What is claimed is:

1. Method of adjusting globally performance parameters of a power driven wheelchair for a plurality of drive programs thereof, said method comprising the steps of:

programming a microcontroller with a plurality of drive programs for operating said wheelchair, each drive program including a multiplicity of adjustable performance parameters;

adjusting a selected performance parameter of said multiplicity to a desired result;

setting a global flag to a desired status;

storing said desired result of said selected performance parameter solely in memory allocated to a selected drive program of said plurality when said global flag is set to a first status; and storing said desired result of said selected performance parameter globally in memory allocated to each of said drive programs of said plurality when said global flag is set to a second status.

2. The method of claim 1 including the step of grouping performance parameters of the multiplicity into first and second groups; wherein the desired results of performance parameters of said first group may be stored only in memory allocated to a selected drive program independent of the status of the global flag; and wherein the desired results of performance parameters of said second group may be stored in memory allocated to the drive programs dependent of the status of the global flag.

3. The method of claim 1 wherein the step of adjusting is performed through an interactive programmer coupled to the microcontroller.

4. The method of claim 3 wherein the step of setting the global flag includes the steps of:

coupling the interactive programmer unit to the microcontroller;

programming the microcontroller to interact with the programmer unlit to display menu images on an image screen; and selecting a desired menu image for display on the image screen of the programmer unit from which to set the global flag to the desired status.

5. The method of claim 4 wherein the steps of storing include:

after adjusting the selected performance parameter, displaying a drive menu image on the screen of the programmer from which to select a drive program for storage of the desired result; and selecting from the drive menu image the drive program in which allocated memory the desired result is to be stored.

6. The method of claim 5 including the step of after adjusting the selected performance parameter, initiating a save task through the programmer unit to display the drive menu image.

7. The method of claim 5 including the step of after selecting the drive program, performing the steps of storing based on the status of the global flag.

8. The method of claim 5 including the step of after selecting the drive program, aborting the steps of storing by initiating an abort task.

9. The method of claim 8 including the step of after aborting the steps of storing, permitting the selected performance parameter to be re-adjusted.

10. The method of claim 4 including the step of selecting another menu image for display on the image screen of the programmer unit from which to select the performance parameter for adjustment.

11. Method of adjusting globally performance parameters of a power driven wheelchair for a plurality of drive programs thereof, said method comprising the steps of:

programming a microcontroller with a plurality of drive programs for operating said wheelchair, each drive program including a multiplicity of adjustable performance parameters;

coupling an interactive programmer unit to the microcontroller;

allocating memory registers of a memory to each of the plurality of drive programs for storage of the performance parameters associated therewith;

adjusting a selected performance parameter of said multiplicity to a desired result through the interactive programmer unit;

setting a global flag to a desired status through the interactive programmer unit;

storing said desired result of said selected performance parameter solely in the memory allocated to a selected drive program of said plurality when said global flag is set to a first status; and storing said desired result of said selected performance parameter globally in the memory allocated to each of said drive programs of said plurality when said global flag is set to a second status.

12. The method of claim 11 including the step of grouping performance parameters of the multiplicity into first and second groups; wherein the desired results of performance parameters of said first group may be stored only in the memory allocated to the selected drive program independent of the status of the global flag; and wherein the desired results of performance parameters of said second group may be stored in the memory allocated to the drive programs dependent of the status of the global flag.

13. The method of claim 11 wherein the step of allocating includes allocating memory registers of a non-volatile memory to each of the plurality of drive programs for storage of the performance parameters associated therewith.

14. The method of claim 11 wherein the step of setting the global flag includes the steps of:

programming the microcontroller to interact with the programmer unit to display menu images on an image screen; and selecting a desired menu image for display on the image screen of the programmer unit from which to set the global flag to the desired status.

15. The method of claim 14 wherein the steps of storing include:

after adjusting the selected performance parameter, displaying a drive menu image on the screen of the programmer from which to select a drive program for storage of the desired result; and selecting from the drive menu image the drive program in which allocated memory the desired result is to be stored.

16. The method of claim 15 including the step of after adjusting the selected performance parameter, initiating a save task through the programmer unit to display the drive menu image.

17. The method of claim 15 including the step of after selecting the drive program, performing the steps of storing based on the status of the global flag.

18. The method of claim 15 including the step of after selecting the drive program, aborting the steps of storing by initiating an abort task.

19. The method of claim 18 including the step of after aborting the steps of storing, permitting the selected performance parameter to be re-adjusted.

20. The method of claim 14 including the step of selecting another menu image for display on the image screen of the programmer unit from which to select the performance parameter for adjustment.

* * * * *